Aug. 31, 1948.    B. GORDON    2,448,427
KNEE PAD DOLLY
Filed Dec. 6, 1946
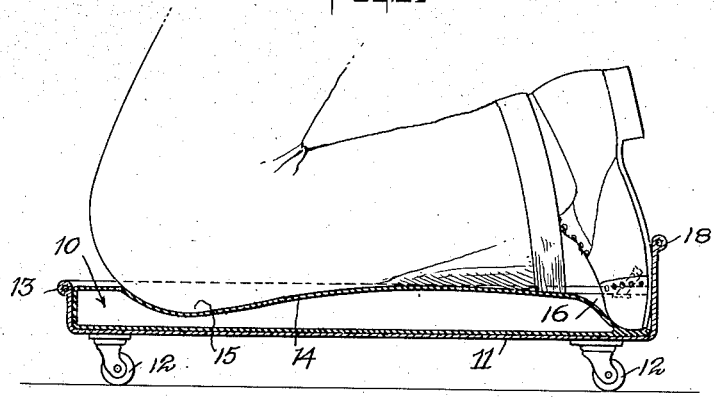
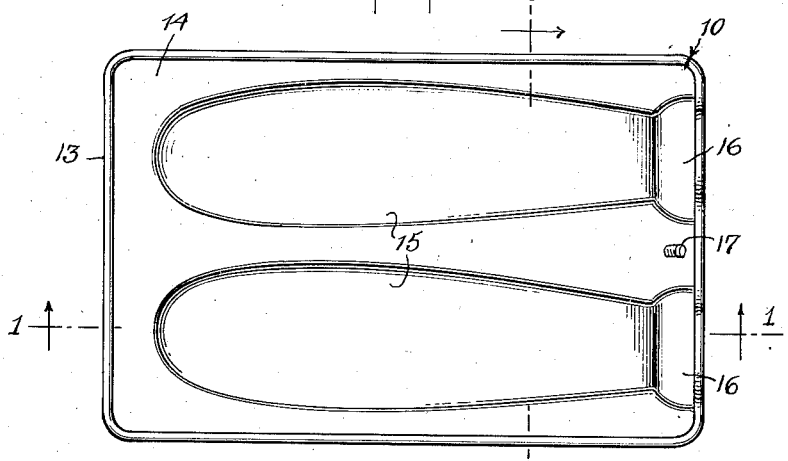
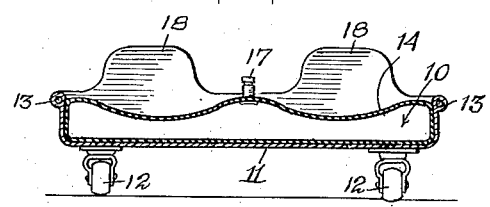
INVENTOR.
Benjamin Gordon
BY
Munn, Liddy & Glaccum
Attorneys Patented Aug. 31, 1948

2,448,427

UNITED STATES PATENT OFFICE 2,448,427

KNEE PAD DOLLY

Benjamin Gordon, New York, N. Y.

Application December 6, 1946, Serial No. 714,571

2 Claims. (Cl. 155—167)

My invention relates to an improved type of mobile kneeling bench which I have referred to as a knee pad dolly.

The invention aims to improve generally on this type of device and to incorporate new features which will assist the user in performing his work.

This device has many uses but would be particularly adapted to that type of work that requires the operator to work in proximity to the floor, such as in laying carpet, linoleum, etc.

The main objective of my invention was to design such a unit that would adequately and comfortably support the user from knee to toe. The disadvantage of many of the present day devices of this type being that they are inadequate in their dimensions, offering cramped and unsatisfactory accommodations to the user.

An additional feature of my device is the extension at the rear wall of the dolly that furnishes support to the feet of the user and thereby serving to steady him and make his position more secure during his working operations.

Other features in my device involve ease of movement, lightweight construction and an air cushion constructed from heavy material that affords a maximum of comfort to the operator.

Additional advantages and unique features of my device will become apparent as I proceed with the description.

Referring to the drawings—

Figure 1 shows a cross section view on line 1—1 of Fig. 2;

Fig. 2 shows a plan elevation of my device; and

Fig. 3 shows a cross section view on the line 3—3 of Fig. 2.

Figure 2 shows a knee pad dolly 10 which is comprised of a platform or frame 11, supported by four ball bearing casters 12, affixed to each corner of the underneath side of the dolly 10. The casters 12 are so designed that they are free to move in any direction enabling the operator to move and change the position of the dolly with a minimum of effort. The platform 11, which is roughly rectangular in shape, can be stamped from one sheet of metal resulting in the formation of the four sides that extend for a short distance from the base of the platform 11. Around the top portion of the four sides is a rolled edge 13 which can either be formed from the sides or by welding a lightweight metal tube to the top edge of the sides. This results in the formation of a dolly that not only is attractive in appearance but has rounded edges that not only protect the user but prevents furniture or other similar objects from being marred by contact with sharp edges.

In its preferred form, it is contemplated to manufacture this article utilizing lightweight metal alloys that will not only furnish sufficient structural strength but will also result in light weight that will facilitate in the handling and moving of the dolly to and from various locations.

Placed on the platform 11 of the dolly 10 is an air tight pre-formed hollow cushion 14. The cushion 14 is provided with two large depressed portions 15 which are shaped to fit the knees and shins of the user. In addition, there are two smaller depressed areas 16 near the rear edge of the dolly 10 that are adapted to receive the toes of the operator's shoes. This cushion, in its preferred form, is made of rubber sufficiently heavy to retain its normal shape when inflated with air through valve 17. Figure 1 illustrates the position of the operator's leg while using this device, showing the leg being supported from knee to toe by the cushion 14. An additional feature of the cushion 14 is that it is constructed in such a manner that it may easily be removed from the platform 11 if desired.

Figure 3 shows the two raised portions or supports 18 affixed to the rear edge and which are positioned directly to the rear of the toe depressions 16. The supports 18 are rigid enabling the operator to place the sole of his shoe against them which serves as a brace and to steady his position on the dolly during working operations. These supports also can be utilized to serve as handles when the operator is transferring the dolly from one location to another.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

I claim:

1. In a device of the character described, a rectangular platform with raised sides shaped from a single sheet of material, casters affixed to underneath portion and supporting said platform, an air cushion positioned on said platform being equipped with means for inflating, said cushion equipped with depressions shaped to conform to the knees and shins of a human, raised supports attached to the rear edge of said device serving as bracers for the operator's feet.

2. In a device of the character described a rectangular platform with raised sides shaped from a single sheet of material, casters affixed to the underneath portion and supporting said platform, a removable air cushion being equipped with means for inflating positioned on said platform, said cushion being pre-formed with depressions shaped to conform to the knees and shins of the operator, additional depressions positioned immediately to the rear of said first mentioned depressions adapted to receive the toes of said operator, raised supports attached to the rear edge of said device adapted to serve as bracers for the operator's feet.

BENJAMIN GORDON.

REFERENCES CITED

The following references are of record in the file of this patent:

UNITED STATES PATENTS

| Number | Name | Date |
|---|---|---|
| 967,004 | Ehikian | Aug. 9, 1910 |
| 1,595,698 | Wilson | Aug. 10, 1926 |
| 1,690,405 | Du Rocher | Nov. 6, 1928 |
| 2,318,059 | Cooper | May 4, 1943 |

FOREIGN PATENTS

| Number | Country | Date |
|---|---|---|
| 76,094 | Germany | July 9, 1894 |